US008280046B2

(12) United States Patent
Rudolf et al.

(10) Patent No.: US 8,280,046 B2
(45) Date of Patent: Oct. 2, 2012

(54) METHOD AND SYSTEM FOR DERIVING AN ENCRYPTION KEY USING JOINT RANDOMNESS NOT SHARED BY OTHERS

(75) Inventors: Marian Rudolf, Montreal (CA); Rajat Pritam Mukherjee, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1198 days.

(21) Appl. No.: 11/318,381

(22) Filed: Dec. 23, 2005

(65) Prior Publication Data

US 2007/0058808 A1 Mar. 15, 2007

Related U.S. Application Data

(60) Provisional application No. 60/716,177, filed on Sep. 12, 2005, provisional application No. 60/734,331, filed on Nov. 7, 2005.

(51) Int. Cl.
*H04L 29/06* (2006.01)
(52) U.S. Cl. .......... 380/44; 380/277; 380/255; 713/168; 713/171
(58) Field of Classification Search .................. 380/44
See application file for complete search history.

(56) References Cited

U.S. PATENT DOCUMENTS

| | | |
|---|---|---|
| 4,140,973 A | 2/1979 | Stevens |
| 4,200,770 A | 4/1980 | Hellman et al. |
| 4,882,737 A | 11/1989 | Dzung |
| 5,161,244 A | 11/1992 | Maurer |
| 5,450,456 A | 9/1995 | Mueller |
| 5,604,806 A | 2/1997 | Hassan et al. |
| 5,745,578 A * | 4/1998 | Hassan et al. ............. 380/44 |
| 5,970,060 A | 10/1999 | Baier et al. |
| 5,995,533 A | 11/1999 | Hassan et al. |
| 6,031,913 A | 2/2000 | Hassan et al. |
| 6,157,619 A | 12/2000 | Ozluturk et al. |
| 6,182,214 B1 | 1/2001 | Hardjono |
| 6,377,792 B1 | 4/2002 | Brown et al. |
| 6,438,367 B1 | 8/2002 | Crawford |

(Continued)

FOREIGN PATENT DOCUMENTS

JP    H-10-512727    12/1998

(Continued)

OTHER PUBLICATIONS

J. E. Hershey, A. A. Hassan, and R. Yarlagadda, "Unconventional cryptographic keying variable management," IEEE Trans. on Communications, vol. 43, pp. 3-6, Jan. 1995.*

(Continued)

*Primary Examiner* — Edward Zee
*Assistant Examiner* — Yogesh Paliwal
(74) *Attorney, Agent, or Firm* — Woodcock Washburn LLP (57) ABSTRACT

The present invention is related to a method and system for deriving an encryption key using joint randomness not shared by others (JRNSO). Communicating entities generate JRNSO bits from a channel impulse response (CIR) estimate and the JRNSO bits are used in generation of an encryption key. The authentication type may be IEEE 802.1x or a pre-shared key system. In an IEEE 802.1x system, a master key, a pairwise master key or a pairwise transient key may be generated using the JRNSO bits. The encryption key may be generated by using a Diffie-Hellman key derivation algorithm.

19 Claims, 7 Drawing Sheets

U.S. PATENT DOCUMENTS

| | | | |
|---|---|---|---|
| 6,904,110 | B2 | 6/2005 | Trans et al. |
| 6,978,022 | B2 | 12/2005 | Okimoto et al. |
| 7,006,633 | B1 | 2/2006 | Reece |
| 7,246,240 | B2 | 7/2007 | Chuang et al. |
| 7,307,275 | B2 | 12/2007 | Lidar et al. |
| 7,333,611 | B1 | 2/2008 | Yuen et al. |
| 7,403,623 | B2 | 7/2008 | Cerf et al. |
| 7,515,714 | B2 | 4/2009 | Orihashi et al. |
| 7,587,598 | B2 | 9/2009 | Ohba et al. |
| 2001/0036268 | A1 | 11/2001 | Karoda et al. |
| 2001/0038674 | A1 | 11/2001 | Trans |
| 2001/0055980 | A1 | 12/2001 | Sato |
| 2002/0044654 | A1 | 4/2002 | Maeda et al. |
| 2002/0106084 | A1 | 8/2002 | Azuma et al. |
| 2003/0086508 | A1* | 5/2003 | Magee ........................ 375/340 |
| 2003/0115453 | A1 | 6/2003 | Grawock |
| 2003/0126551 | A1 | 7/2003 | Mantha et al. |
| 2004/0193971 | A1 | 9/2004 | Soong et al. |
| 2005/0084031 | A1 | 4/2005 | Rosen et al. |
| 2007/0036353 | A1 | 2/2007 | Reznik et al. |
| 2007/0063884 | A1 | 3/2007 | Iwamura et al. |
| 2007/0076871 | A1 | 4/2007 | Renes |
| 2008/0090572 | A1 | 4/2008 | Cha et al. |
| 2008/0282127 | A1 | 11/2008 | Mantha et al. |
| 2008/0304658 | A1 | 12/2008 | Yuda et al. |

FOREIGN PATENT DOCUMENTS

| | | |
|---|---|---|
| JP | 2000-512825 | 9/2000 |
| JP | 2003-273856 | 9/2003 |
| JP | 2004-032679 | 1/2004 |
| JP | 2004-056762 | 2/2004 |
| JP | 2004-187197 | 7/2004 |
| JP | 2004-201288 | 7/2004 |
| JP | 2004-208073 | 7/2004 |
| JP | 2005-130127 | 5/2005 |
| JP | 2005-176320 | 6/2005 |
| JP | 2006-180549 | 7/2006 |
| TW | 200418297 | 9/2004 |
| WO | 00/10317 | 2/2000 |
| WO | 00/30319 | 5/2000 |
| WO | WO 2006/011345 | 2/2006 |
| WO | WO 2006/013699 | 2/2006 |
| WO | WO 2006/013798 | 2/2006 |

OTHER PUBLICATIONS

The authoritative Dictionary of IEEE standards Terms, Seventh Edition, p. 872.*

Ahlswede et al., Common Randomness in Information Theory and Cryptography—Part I : Secret Sharing, *IEEE Transactions on Information Theory*, vol. 39, No. 4, pp. 1121-1132 (Jul. 1993).

*Burrows-Wheeler Transformation / Block Sorting (BWT)* at http://www.data-compression.info/Algorithms/BWT/index.htm, downloaded May 16, 2007.

Carter et al., Universal Classes of Hash Functions. *Journal of Computer and System Sciences*, vol. 18, No. 2, pp. 143-154, (Apr. 1979).

Cover, T. M. et al., "Network Information Theory," *Elements of Information Theory*, pp. 374-458, (John Wiley & Sons, Inc. 1991) (Internet Publishing Date 2001) downloaded from http://dx.doi.org/10.1002/0471200611.ch14.

Csiszár et al., Common Randomness and Secret Key Generation with a Helper, *IEEE Transactions on Information Theory*, vol. 46, No. 2, pp. 344-366 (Mar. 2000).

Csiszár et al., Secrecy Capacities for Multiple Terminals, *IEEE Transactions on Information Theory*, vol. 50, No. 12, pp. 3047-3061, (Dec. 2004).

Dobbertin et al., RIPEMD-160: A Strengthened Version of RIPEMD, in *Fast Software Encryption LNCS 1039*, pp. 71-82, (D. Gollman, Ed., Springer-Verlag, Apr. 1996).

IEEE 802 Committee, IEEE P802.11r™/ D0.01, Jun. 2005 (Draft Amendment to IEEE Std 802.11™, 2005 (based on 802.1ma D1.0) 802.11e™-2005, 802.11k-????), *Draft Amendment to Standard for Information Technology—Telecommunications and information exchange between systems—LNA/MAN—Specific Requirements*. Part 11: Wireless Medium Access Control (MAC) and Physical Layer (PHY) Specifications Amendment 8: Fast BSS Transition, (2005 IEEE Computer Society, IEEE 802 Committee).

IEEE 802 Committee, IEEE P802.11r™ / D1.0, Nov. 2006 (Draft Amendment to IEEE Std 802.11™, 2005 (based on 802.1ma D4.0), 802.11e™-2005, 802.11k-D3.0), *Draft Amendment to Standard for Information Technology—Telecommunications and information exchange between systems—LAN/MAN—Specific Requirements*. Part 11: Wireless Medium Access Control (MAC) Specifications, Amendment 2: Fast BSS Transition, (2005 IEEE Computer Society, IEEE 802 Committee).

IEEE LAN/ MAN Standards Committee, ANSI/IEEE Std. 802.11, 1999 Edition (R2003), *Information Technology—Telecommunications and information exchange between systems—Local and metropolitan area networks—Specific Requirements*. Part 11: Wireless LAN Medium Access Control (MAC) and Physical Layer (PHY) Specifications (Reaffirmed Jun. 12, 2003, IEEE Computer Society, LAN/ MAN Standards Committee).

IEEE LAN/ MAN Standards Committee, IEEE STD 802.11i™-2004 (Amendment to IEEE Std 802.11™, 1999 Edition (Reaff 2003)), *IEEE Standard for Information Technology—Telecommunications and information exchange between systems—Local and metropolitan area networks—Specific Requirements*. Part 11: Wireless LAN Medium Access Control (MAC) and Physical Layer (PHY) Specifications Amendment 6: Medium Access Control (MAC) Security Enchancements, (Jul. 23, 2004 IEEE Computer Society, LAN/ MAN Standards Committee).

IEEE LAN/ MAN Standards Committee, IEEE Std 802.1X™-2004 (Revision of IEEE Std 802-1x-2001). *IEEE Standard for Local and Metropolitan Area Networks*, Port-Based Network Access Control, (Dec. 13, 2004, IEEE Computer Society, LAN/ MAN Standards Committee).

Liveris et al., Compression of Binary Sources With Side Information at the Decoder Using LDPC Codes, *IEEE Communications Letters*, vol. 6, No. 10, pp. 440-442, (Oct. 2002).

Maurer et al., Information-Theoretic Key Agreement: From Weak to Strong Secrecy for Free. In *Advances in Cryptology-EUROCRYPT 2000*, vol. 1807 of *Lecture Notes in Computer Science*, pp. 351-368 (B. Preneel, editor, Springer-Verlag, 2000).

Maurer et al., Unconditionally Secure Key Agreement and the Intrinsic Conditional Information, *IEEE Transactions on Information Theory*, vol. 45, pp. 499-514, (1999).

Maurer et al., Secret-Key Agreement over Unauthenticated Public Channels—Part I: Definitions and a Completeness Result, *IEEE Transactions on Information Theory*, vol. 49, No. 4, pp. 822-831 (2003).

Maurer, Ueli M., Secret Key Agreement by Public Discussion from Common Information, *IEEE Transactions on Information Theory*, vol. 39, pp. 733-742, (1993).

NIST, Secure Hash Standard, *Federal Information Processing Standards Publication (FIPS PUB) 180-1*, US Department of Commerce, Washington, D.C. (Apr. 1995).

NIST, Specification for the Advanced Encryption Standard (AES). *Federal Information Processing Standards Publication* (FIPS PUB) 197, (Nov. 26, 2001, U.S. Deparment of Commerce/N.I.S.T.).

Omar et al., *A Study on Hash Functions for Cryptography*. A Study on Hash Functions for Cryptography (Research Index) Sans Institute 2003.

Pradhan et al., *Distributed Source Coding Using Syndromes (DISCUS) Design and Construction*, in the Proceedings of the *1999 IEEE Data Compression Symposium*, DCC'99, (Snowbird Utah, Mar. 1999).

Rabin, M., *Digitalized Signatures and Public-Key Functions as Intractable as Factorization*, Massachusetts Institute of Technology, Laboratory for Computer Science, Technical Report MIT/LCS/TR-212, (Jan. 1979).

Rivest, R. L., The MD4 Message-Digest Algorithm, *Request for Comments (RFC) 1320*, Internet Activities Board, Internet Privacy Task Force, (Apr. 1992).

Rivest, R. L., *The MD5 Message-Digest Algorithm*, Request for Comments (RFC) 1321, Internet Activities Board, Internet Privacy Task Force, (Apr. 1992).

Wang et al., Collisions for Hash Functions MD4, MD5, HAVAL-128 and RIPEMD. *Cryptology ePrint Archive, Report 2004/199*, (revised Aug. 17, 2004).

Ye, Chunxuan, Information Theoretic Generation of Multiple Secret Keys (2005) pp. 97-102. (Ph.D Dissertation, University of Maryland).

Zheng et al., *HAVAL—A One-Way Hashing Algorithm with Variable Length of Output*, AUSCRYPT'92, (Gold Coast, Dec. 1992).

Japanese Patent Application No. 2007-553138: Rejection dated Aug. 20, 2010, 22 pages.

Korean Patent Application No. 10-2007-7018125: Notice of Decision for Patent dated Oct. 22, 2010, 4 pages.

EP Application No. 06718847.4 : Extended European Search Report, Aug. 12, 2011, 6 pages.

Koorapaty et al., "Secure Information Transmission for Mobile Radio", IEEE Communications Letters, IEEE Service Center, Feb. 2000, 4(2), 52-55.

\* cited by examiner

METHOD AND SYSTEM FOR DERIVING AN ENCRYPTION KEY USING JOINT RANDOMNESS NOT SHARED BY OTHERS

CROSS REFERENCE TO RELATED APPLICATIONS

This application claims the benefit of U.S. Provisional Application Nos. 60/716,177 filed Sep. 12, 2005 and 60/734,331 filed Nov. 7, 2005, which are incorporated by reference as if fully set forth.

FIELD OF INVENTION

The present invention is related to wireless communication security. More particularly, the present invention is related to a method and system for deriving an encryption key using joint randomness not shared by others (JRNSO).

BACKGROUND

IEEE 802.11i is used to ensure that a wireless local area network (WLAN) operating under IEEE 802.11 standards can communicate data securely by using a counter mode (CTR) with cipher-block chaining with a message authentication code (CBC-MAC) protocol (CCMP) encapsulation technique which, in turn, utilizes an advanced encryption standard (AES) algorithm. To achieve this goal, IEEE 802.11i provides two schemes that allow a pair of communicating nodes to derive keys that can be used to encrypt exchanged packets.

The first scheme is based on an IEEE 802.1x authentication technique that requires a remote authentication server, (e.g. a RADIUS server). In IEEE 802.1x, an access point (AP) acts as a router between a wireless transmit/receive unit (WTRU) desiring association with the AP and an authentication server. The authentication server provides a public key to the WTRU via the AP. The WTRU can verify this public key by checking it with a digital certificate provided by the authentication server. The WTRU then derives a random secret, (i.e., master secret), and sends the master secret to the authentication server by encrypting it with the public key provided. Thus, only the authentication server can decrypt the master secret using a corresponding private key. The authentication server and the WTRU use this master secret to derive a master key (MK). The authentication server and the WTRU then derive a pairwise master key (PMK) from the MK. The authentication server provides this PMK to the AP. The AP and the WTRU then derive a pairwise transient key (PTK) using the PMK. A portion of this PTK is a temporal key (TK) that is the actual key used in the CCMP technique for encrypting packets. Because this scheme uses remote authentication servers and digital certificates, (which are currently expensive), such a scheme is typically implemented in an enterprise WLAN.

The second scheme that is more suitable for home or small business networks utilizes a pre-shared key (PSK). In this scheme, a 256 bit user-configurable secret key is stored on the communicating nodes. When the WTRU wishes to associate with an AP, the WTRU uses the PSK as a PMK, (without deriving the master secret and the MK), and derives a PTK and uses a portion of the PTK as a TK just like in the IEEE 802.1x system.

There are at least two problems with the IEEE 802.11i system. First, the final TK is only as secure as the master secret exchanged in the case of IEEE 802.1x networks, or as the PSK in the case of home or small business networks. In the IEEE 802.1x system, an attacker can decrypt the master secret by stealing the authentication server's private key. In home networks, the PSK can either be deduced using a brute-force attack, (being that PSKs at home are not changed regularly or are generated from a "weak" pass-phrase), or by stealing the key. Knowing the master secret or the PSK allows the attacker to arrive at the identical value for the PMK, in the same manner as the two legitimate communicating nodes, and to thereafter derive an identical PTK value. Thus, knowledge of authentication credentials is sufficient for knowledge of derived encryption keys. Moreover, when keys are updated during a session the MK and the PMK are typically left untouched and only a new PTK is derived using the PMK, (which is supposed to be a secret), and information exchanged in the clear. As the PMK does not change, the PTK is not fresh and is therefore not a new key.

Furthermore, the key derivation procedure is very complex and it has many stages, (such as MK, PMK, PTK and TK). This consumes time and resources.

Keys can be thought of as bit sequences. A perfectly secret random key of length N bits is an N-bit sequence S, shared by entities. Given all the information available in the system at large, anyone else's estimation about what this key sequence can be is roughly equiprobably distributed over all possible $2^N$ N-bit sequences.

Prior art crypto systems rely on the fact that it may be extremely difficult from a computational resource point of view to guess the crypto key. However, in most of these systems, once the correct guess is produced, it is very easy to verify that this is indeed the correct guess. In fact, the prior art implies that this is applicable to any public-key system, (i.e., one where the encryption key is made public, while the decryption key is kept secret).

By way of example, assume that p and q are two large prime numbers and s=pq, it is well known that the problem of factoring a product of two large prime numbers is extremely computationally difficult. If a party chooses p and q in secret and makes publicly available their product s, which is then used as an encryption key for an encryption system, it cannot be easily decrypted unless one knows p and q. An eavesdropper wishing to intercept an encrypted message would likely start by attempting to factor s, which is known to be computationally difficult. However, if the eavesdropper guesses p, it will quite easily verify that it has the right answer. The ability to know that the right answer was obtained with a guess differentiates computational secrecy from perfect secrecy. Perfect secrecy implies that even if the attacker guesses the key correctly, it will have no ability to determine that it has indeed done so.

It is therefore desirable to generate encryption by keys without the limitations of the prior art.

SUMMARY

The present invention is related to a method and system for deriving an encryption key using JRNSO. Communicating entities generate JRNSO bits from a CIR estimate and the JRNSO bits are used in generation of an encryption key. The authentication type may be IEEE 802.1x or a pre-shared key system. In an IEEE 802.1x system, an MK, a PMK and/or a PTK may be generated using the JRNSO bits. The encryption key may be generated by using a Diffie-Hellman key derivation algorithm.

DETAILED DESCRIPTION OF THE PREFERRED EMBODIMENTS

Hereafter, the terminology "WTRU" includes but is not limited to a user equipment, a STA, a fixed or mobile subscriber unit, a pager, or any other type of device capable of operating in a wireless environment. When referred to hereafter, the terminology "AP" includes but is not limited to a Node-B, a base station, a site controller or any other type of interfacing device in a wireless environment.

The features of the present invention may be incorporated into an integrated circuit (IC) or be configured in a circuit comprising a multitude of interconnecting components. The present invention may be implemented as digital signal processor (DSP), software, middleware, hardware, applications or future system architecture. The elements may be subcomponents of a larger communication system or ASIC and some or all of the processing elements may be shared for other elements.

In a wireless communication system, while correlated random sources are a priori difficult to produce without prior communication, a wireless channel provides just such a resource in the form of a channel impulse response (CIR). Specifically, in certain communications systems, two communicating parties, (e.g., Alice and Bob), will measure very similar CIR estimates. Wideband code division multiple access (WCDMA) time division duplex (TDD) systems have this property. On the other hand, any party not physically co-located with Alice and Bob is likely to observe a CIR that has very little correlation with that of Alice and Bob. This difference can be exploited for generation of perfectly secret keys. The channel is the source of JRNSO and the CIR estimations are the samples taken from the channel.

A Diffie-Hellman key derivation procedure is explained hereinafter. Alice and Bob agree to use a prime number p and a base g. Alice chooses a secret integer a, then sends Bob $g^a$ mod p. Bob chooses a secret integer b, then sends Alice $g^b$ mod p. Alice computes $(g^b \bmod p)^a \bmod p$. Bob computes $(g^a \bmod p)^b \bmod p$. $(g^b \bmod p)^a \bmod p$ and $(g^a \bmod p)^b \bmod p$ are the same. As an example, Alice and Bob agree to use a prime number p=23 and base g=3. Alice chooses a secret integer a=6, then sends Bob $g^a$ mod p=$3^6$ mod 23=16. Bob chooses a secret integer b=15, then sends Alice $g^b$ mod p=$3^{15}$ mod 23=12. Alice computes $(g^b \bmod p)^a \bmod p = 12^6 \bmod 23 = 9$. Bob computes $(g^a \bmod p)^b \bmod p$ p=$16^{15}$ mod 23=9.

Much larger numbers are needed to make this scheme secure. If p is a prime number greater than 300 digits, and a and b are greater than 100 digits, it would be practically impossible to attack since such calculations are too resource intensive, (even for the legitimate communicating parties). As such, this prevents such a protocol from being implemented on mobile devices where battery power is limited.

If one (or both) of the numbers p or g is agreed upon secretly by using JRNSO, this would allow the two communicating nodes to use smaller numbers for a, b, p and/or g, while achieving comparable security. The Diffie-Hellman shared key can either act as the encryption key or be used to encrypt and send the actual encryption key. Smaller numbers used can make the key derivation process less resource intensive, thus allowing it to be used on mobile devices.

Figure 1:
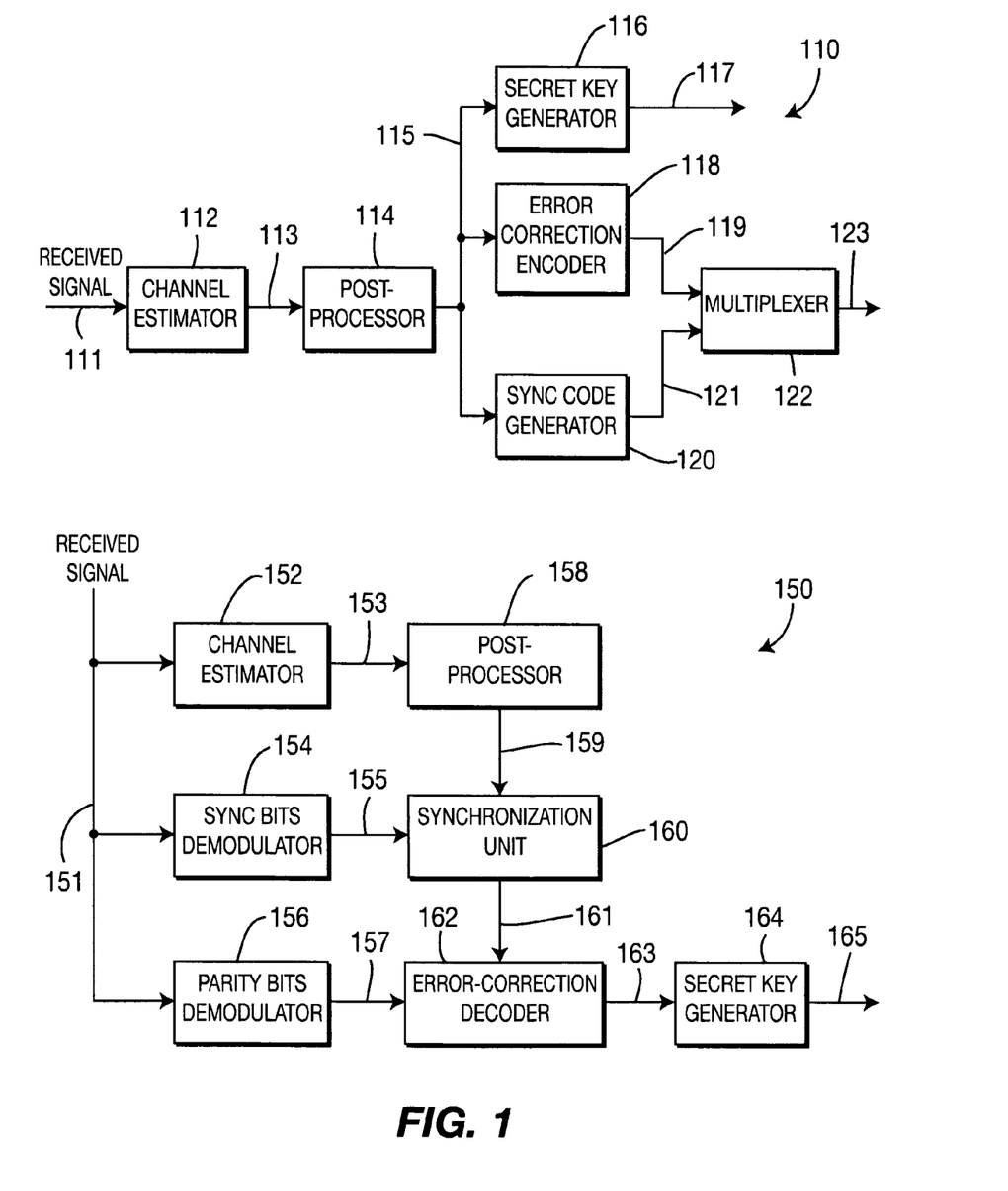
FIG. 1 is a block diagram of a system including two communicating entities for deriving a secret key in accordance with the present invention.

FIG. 1 is a block diagram of a system 100 including two communicating entities, (a first node 110 and a second node 150), for deriving JRNSO bits and a secret key in accordance with the present invention. One of the entities may be a WTRU and the other may be an AP. For simplicity, a point-to-point communication system having only two communicating entities 110, 150 is described in FIG. 1. However, the present invention may be applied to a point-to-multipoint communication system involving more than two entities. It should also be noted that the first node and the second node are essentially the same entities including the same elements, but for simplicity, FIG. 1 depicts only relevant elements for the first node and the second node, as the first node is assumed to take a lead in generation of the JRNSO bits and a secret key, which will be explained in detail hereinafter.

In accordance with the present invention, one of the communicating entities takes a lead. It is assumed that the first node 110 takes the lead. The first node 110 includes a channel estimator 112, a post-processor 114 (optional), an error correction encoder 118, a synchronization code generator 120 (optional), a secret key generator 116 and a multiplexer 122.

The channel estimator 112 of the first node generates a CIR estimate 113 based on received signals 111 from the second node 150. The channel estimator 152 in the second node 150 also generates a CIR estimate 153 based on transmissions sent by the first node 110. The outputs of the channel estimators 112, 152 are digitized representations of the CIR estimates. Any prior art methods may be used for generating the CIR estimate. For example, the entities 110, 150 may send special signaling or a pilot sequence to the other node for aiding the generation of the CIR estimates. The CIR estimates may be generated and stored in any way including, but not limited to, in a time domain, in a frequency domain or may be represented using an abstract vector space, or the like. The method for generating the CIR estimate and representation scheme should be the same in both the first node 110 and the second node 150.

Depending on the implementation, only partial information of the CIR estimate may be reciprocal, and therefore, suitable for generation of a common secret key. For example, the entities 110, 150 may choose to utilize only amplitude/power profile information of the CIR estimate and may ignore the phase information.

The post-processor 114 may optionally process the CIR estimate using prior art methods. The post-processor 114, (such as a low-pass filter or an interpolating filter), removes noise and redundancies. The post-processor 114 is also necessary in the case where the entities are equipped with multiple antennas for multiple-input multiple-output (MIMO) and therefore differences in the number of antennas and antenna patterns may cause the CIR estimates to differ. In this case the entities 110, 150 may have to exchange information about their antenna configuration.

Figure 2:
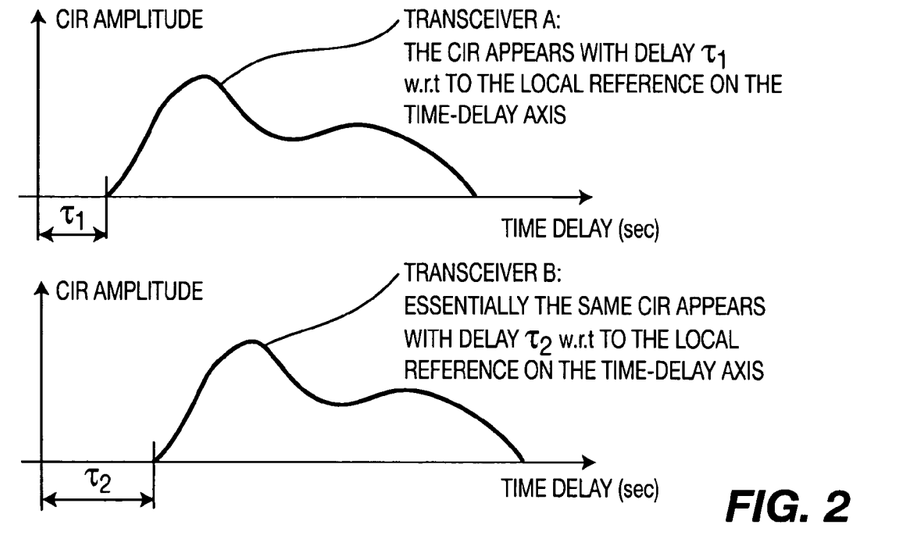
FIG. 2 illustrates a problem of discrepancy of CIR estimates due to different starting points at a first node and a second node.

Because of channel reciprocity, the CIR estimates generated by the first node 110 and the second node 150 are expected to be very similar. However, there are three main error sources that introduce discrepancies in the CIR estimates. First, the channel reciprocity assumes simultaneous estimation of the channel at both entities. Differences in the simultaneity result in some difference in channel estimates. Second, the digitized CIR estimates may need to be synchronized with respect to the starting point. For example, if the CIR estimates are digitized in time domain, the start of the meaningful portion of the CIR estimate may occur at a different place with respect to the reference zero-time in the two entities 110, 150. This problem is illustrated in FIG. 2. As another example, if the CIR estimate is stored using frequency domain representation, a different starting frequency/reference phase may be assumed in determining the storage parameters. Third, the CIR estimates also differ due to errors caused by interference which is inherent in wireless communication.

As to the first source of error, in order to ensure simultaneity in channel estimation, the channel estimation timing may be tied to a specific system time, such as a radio frame or slot boundary. Alternatively, a synchronization signal maybe embedded in the signals, (such as pilot signals), which the entities 110, 150 transmit to support channel estimation. Synchronization may be obtained from such pilot signal without requiring embedding of a special signal. Alternatively, channel estimation may be performed with reference to an absolute time reference, such as a global positioning system (GPS). Alternatively, a roundtrip delay may be measured and synchronization may be achieved based on this roundtrip delay.

As to the second source of error, the starting point of the CIR estimate may be recorded at the first node 110 and transmitted to the second node 150. Alternatively, a special synchronization code, (e.g., comma-free codes), may be used. Since the synchronization problem is typically limited to just a few samples, only a limited performance is needed from such a code. A special synchronization signal related to a common timing source, (e.g., GPS), may be generated by the terminals and the CIR measurement may be made with respect to such a signal. The synchronization problem may be dealt with by processing the CIR in a domain where it is not an issue. For example, provided that phase information is ignored, the synchronization problem is not present in the frequency domain.

Depending on the interference level of the channel, the secrecy rate loss may be large or minimal. For example, in a very noisy channel, the phase information may be highly unreliable, thus ignoring it would cause minimal secrecy rate loss.

Referring again to FIG. 1, the post-processed CIR estimate 115 is fed to the secret key generator 116, the synchronization code generator 118 and the error correction encoder 120. The secret key generator 116 generates a secret key 117 from the CIR estimate 115, which is JRNSO bits.

The synchronization code generator 120 generates the synchronization signal/code 121 for simultaneity and synchronizing a "starting point." The error correction encoder 118 performs error correction coding on the CIR estimate 115 and generates parity bits 119. The error correction coding may be a block coding or a convolutional coding. The present invention uses systematic error correction coding such that an original message, (i.e., the encoder input which is the CIR estimate 115) is also output from the error correction encoder 118. In accordance with the present invention, only the parity bits 119 are sent to the second node 150 after being multiplexed with the synchronization signal/code 121 by the multiplexer 122. The multiplexed bit stream 123 is sent to the second node 150.

The second node 150 includes a channel estimator 152, a synchronization bit demodulator 154, a parity bit demodulator 156, a post processor 158 (optional), a synchronization unit 160, an error correction decoder 162 and a secret key generator 164. The channel estimator 152 generates CIR estimate from received signals 151 transmitted by the first node 110. The CIR estimate 153 is optionally processed by the post-processor 156 as stated above. The synchronization bit demodulator 154 demodulates the received signals 151 to recover the synchronization signal/code 155. The parity bit demodulator 156 demodulates the received signals 151 to recover the parity bits 157. The synchronization signal/code 155 is fed to the synchronization unit 160 and the parity bits 157 are fed to the error correction decoder 162. The post-processed CIR 159 is processed by the synchronization unit 160. The synchronization unit 160 corrects the discrepancy between the CIR estimates due to the lack of simultaneity and/or the misalignment of the starting point in accordance with the synchronization signal/code 155.

The error correction decoder 162 performs error correction decoding while treating the CIR estimate 159 processed by the synchronization unit 160 as a message part of the codeword, which possibly contains errors and uses the received parity bits 157 to correct the errors. If the block code is well chosen, the output 163 of the error correction decoder 162 is identical to the CIR estimate generated by the first node 110 with very high probability. Thus, the first node 110 and the second node 150 succeed in obtaining the same data sequence while publicly revealing only some portion of it, (i.e., the parity bits), and may derive the same JRNSO bits.

The error correction decoder 162 may be used to support synchronization of the starting point of the digitized CIR estimate. The second node 150 generates a set of CIR estimates and decodes each of the possible CIR estimates with the parity bits 157. The error correction decoder 162 counts the number of errors in each of the CIR estimates. With very high probability, all but the correct one will result in a very high number of corrections; while the correct one results in a very low number of corrections. In this way the error correction decoding process can support the starting point synchronization.

Once the CIR estimates have been aligned between the first node 110 and the second node 150, the secret key generator 164 generates a secret key 165 which is same to the secret key 117 generated by the first node 110.

Figure 3:
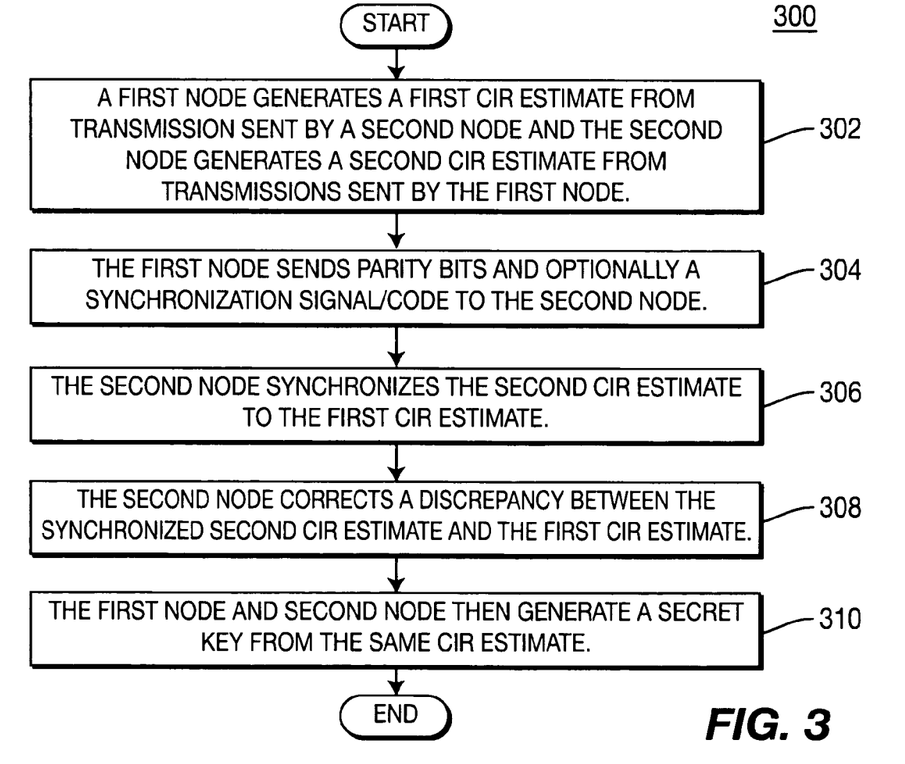
FIG. 3 is a flow diagram of a process for deriving a secret key in accordance with the present invention.

FIG. 3 is a flow diagram of a process 300 for deriving JRNSO bits and a secret key for wireless communication in accordance with the present invention. The first node generates a CIR estimate from transmissions sent by the second node and the second node generates a CIR estimate from transmissions sent by the first node (step 302). In order to correct a discrepancy between the CIR estimate generated by the first node and the CIR estimate generated by the second node, (and optionally to support synchronization of the CIR estimates), the first node sends parity bits (and optionally a synchronization signal/code) to the second node (step 304). The parity bits are generated by error correction coding on the CIR estimate generated by the first node. The second node synchronizes the CIR estimate generated by the second node to the CIR estimate generated by the first node by using a synchronization signal/code sent by the first node or using some other schemes stated above (step 306). The second node then corrects a discrepancy between the synchronized CIR estimate and the CIR estimate generated by the first node by performing error correction decoding on the synchronized CIR estimate with the parity bits (step 308). Steps 302-308 may be repeated several times. In this way, the first node and the second node can obtain the same CIR estimate (JRNSO bits). The first node and the second node then generate a secret key from the same CIR estimate (step 310).

Figure 4:
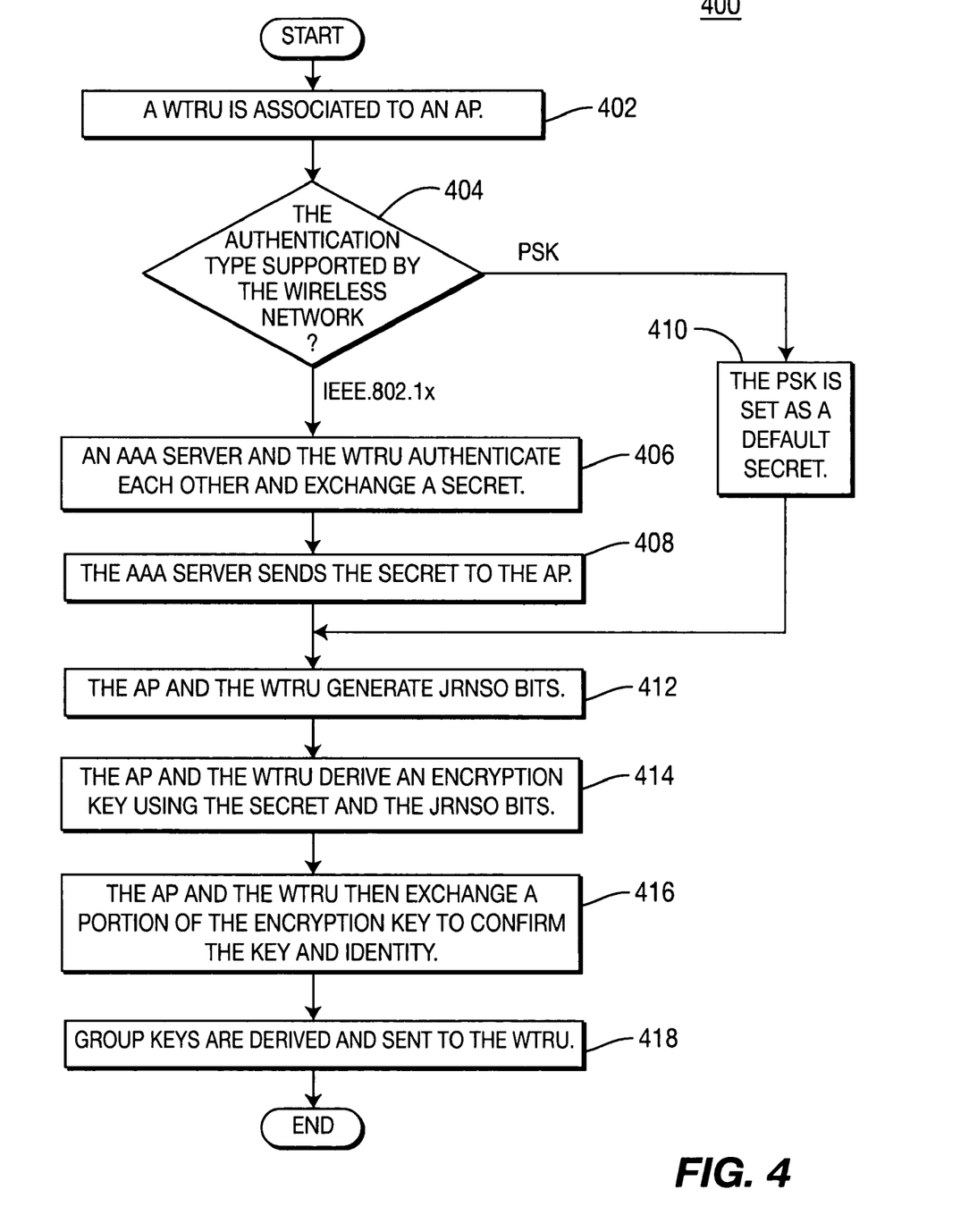
FIG. 4 is a flow diagram of a process for deriving an encryption key using JRNSO bits in accordance with one embodiment of the present invention.

FIG. 4 is a flow diagram of a process 400 for deriving an encryption key using JRNSO bits in accordance with one embodiment of the present invention. Once a WTRU is associated to an AP at step 402, it is determined whether the authentication type supported by the wireless network is IEEE802.1x or PSK (step 404). If IEEE 802.1x is supported, an authentication, authorization, and accounting (AAA) server and the WTRU authenticate each other using digital certificates (step 406). As part of the authentication signaling, the WTRU sends the AAA server a secret encrypted using a public key of the AAA server such that only the AAA server can decrypt it using a corresponding private key. This secret is used as a seed for deriving the encryption key. The AAA server then sends the secret to the AP (step 408). If the supported authentication type is PSK, the PSK is set as a default secret (step 410).

The AP and the WTRU generate JRNSO bits using the process described hereinbefore (step 412). It should be noted that the JRNSO bits may be generated at any step before generation of the encryption key, not just after the secret has been forwarded. The AP and the WTRU derive an encryption key using the secret and the JRNSO bits (step 414). The AP and the WTRU then exchange a portion of the encryption key to confirm the key and identity (step 416). Group keys may be derived and sent to the WTRU using the encryption key as the PTK as done currently in IEEE 802.11i (step 418).

In the event that sufficient JRNSO bits have not been generated by the time the encryption key is ready to be derived, the process according to the IEEE 802.11i standard may be followed. It should be noted that steps 402-410 are necessary for the initial derivation and the encryption key update or refresh can be performed only by deriving new JRNSO bits.

For updating keys, in the case of 802.1x, a new secret may be exchanged and new JRNSO bits may be generated, or alternatively, new JRNSO bits with the old secret may be used. Only the second option is available for the PSK case. Historical information may be used to authenticate JRNSO bits. Both parties may cache some pre-agreed portions of earlier keys. An attacker cannot simply decrypt the master secret using the stolen private key, but must also guess the previous keys derived.

This process explicitly separates the roles of authentication and key generation in the system. The AAA server deals only with authenticating the client while the AP deals with key generation. This is different from IEEE 802.1x where the AAA server is involved both in key derivation and authentication. JRNSO allows a new and fresh encryption key to be derived every few hundredths of a second (depending on channel conditions) dynamically. This is different from prior art where key updates are pre-programmed and are not cryptographically fresh and where to generate a fresh key a new secret has to be exchanged. There is no MK or PMK in the process 400 of the present invention. Thus, the process is simpler than the prior art.

In existing 802.11i protocols, an attacker who gains knowledge of authentication credentials (in case of 802.1x) or the PSK (in case of PSK authentication) has to merely eavesdrop on the signaling exchanges to gain knowledge of the encryption keys. In contrast, while using the method of the present invention, an attacker who possesses the authentication credentials, (e.g., digital certificates or PSK), will be unable to derive the encryption keys as he does not share the same channel that the WTRU and the AP share and hence cannot make the same JRNSO bits.

Under current IEEE 802 standards, a key update is not really cryptographically secure because only the PTK changes but the MK and the PMK remain the same. As the PTK is just the PMK plus random information exchanged in the clear if an attacker guesses the PMK, updating keys does not serve any cryptographic purpose. The master secret used to derive the MK and then the PMK serves a cryptographic purpose and is consequently very long (e.g., 48 bytes). Thus, for a fresh key in IEEE 802.11i, it is necessary to exchange a long 48 byte number that has been derived truly randomly (which is resource intensive). However, according to the present invention, the secret exchanged serves to authenticate the secret key derived from the JRNSO bits and thus only need be long enough to prevent brute force attacks (e.g., about 16 bytes). This makes it feasible to generate it afresh every time a key needs to be updated with JRNSO. The present invention provides a simpler key derivation method with only one short secret exchanged and one set of keys derived, instead of one long key exchanged and 3 sets of keys derived, (i.e., MK, PMK and PTK). This enables power savings on a mobile device.

Figure 5:
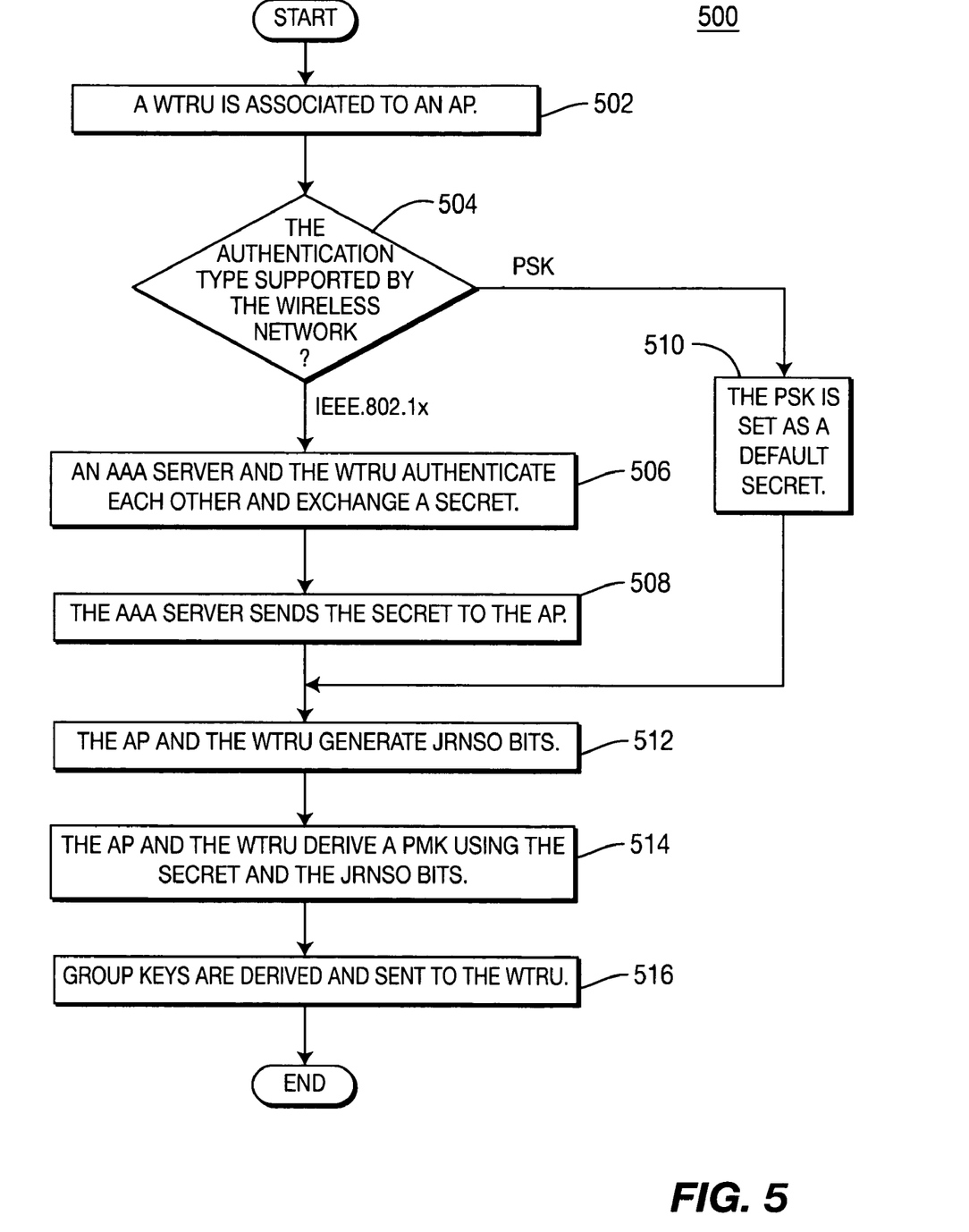
FIG. 5 is a flow diagram of a process for deriving an encryption key using JRNSO bits in accordance with another embodiment of the present invention.

FIG. 5 is a flow diagram of a process 500 for deriving an encryption key using JRNSO bits in accordance with another embodiment of the present invention. The process 500 is similar to process 400. Steps 502-512 are the same as steps 402-412 and, therefore, will not be explained for simplicity. After the secret is forwarded to the AP and JRNSO bits are generated, the AP and the WTRU derive a PMK using the secret and the JRNSO bits (step 514). Group keys are then derived and sent to the WTRU as done currently in IEEE 802.11i (step 516).

Figure 6:
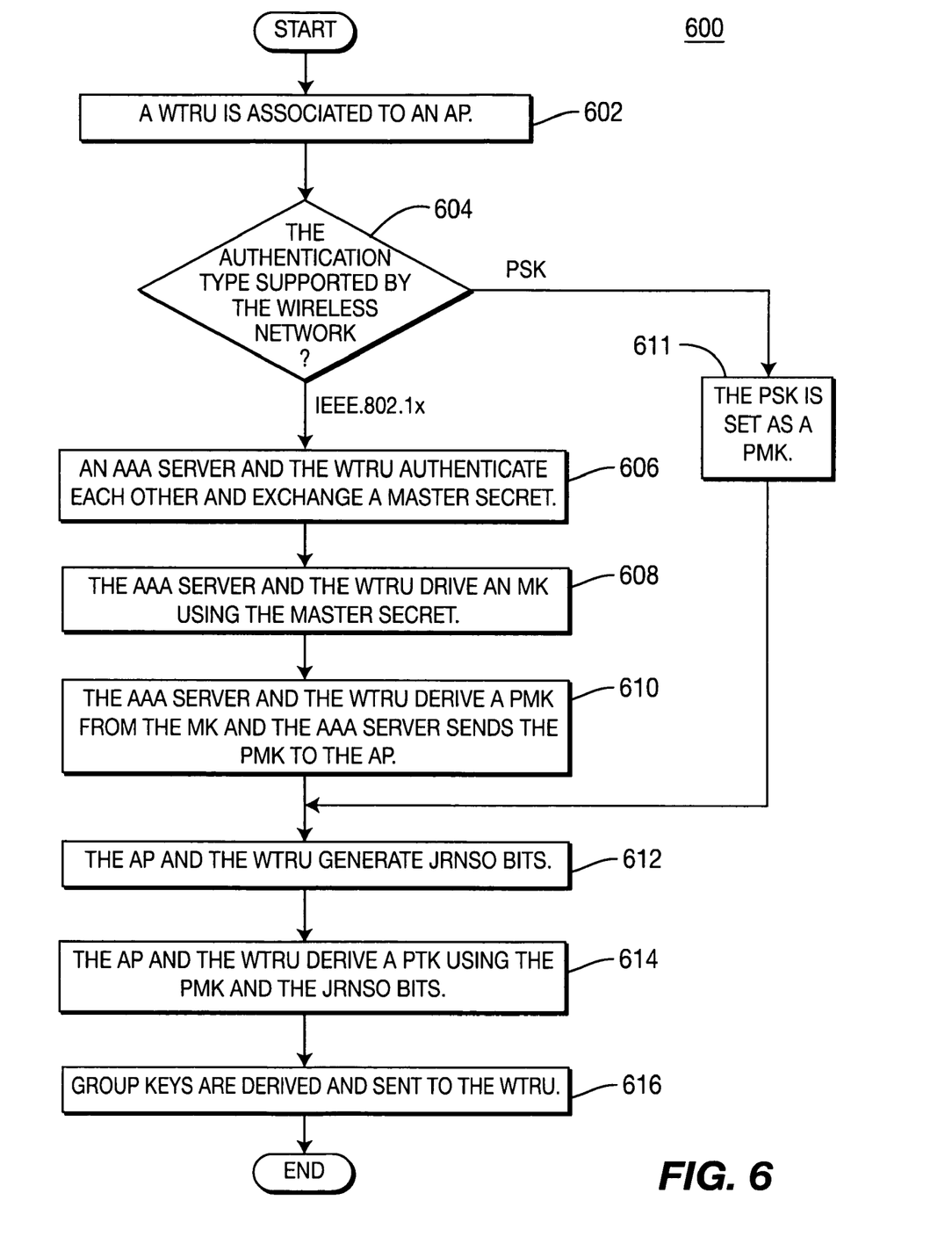
FIG. 6 is a flow diagram of a process for deriving an encryption key using JRNSO bits in accordance with yet another embodiment of the present invention.

FIG. 6 is a flow diagram of a process 600 for deriving an encryption key using JRNSO bits in accordance with yet another embodiment of the present invention. Once a WTRU is associated to an AP at step 602, it is determined whether the authentication type supported by the wireless network is IEEE802.1x or PSK (step 604). If IEEE 802.1x is supported, an AAA server and the WTRU authenticate each other using digital certificates and exchange a master secret (step 606). The AAA server and the WTRU drive an MK using the master secret (step 608). The AAA server and the WTRU then derive a PMK from the MK and the AAA server sends this PMK to the AP (step 610). If the supported authentication type is PSK, the PSK is set as a PMK (step 611).

The AP and the WTRU generate JRNSO bits using the process described hereinbefore (step 612). It should be noted that the JRNSO bits may be generated at any step before generation of the encryption key, not just after the PMK is derived. It may be carried out prior to deriving the PMK (in the case of 802.1x) to speed up the key derivation process. It may also be done during the 4-way handshake process for deriving the PTK. This will allow the system to be compatible with PSK authentication. The parity checks may also be carried out at any time prior to deriving the PTK.

The AP and the WTRU derive a PTK using the PMK and the JRNSO bits (step 614). The PTK may be derived as follows:

PTK=PRF (PMK, Info in the clear, JRNSO bits).

Group keys are then derived and exchanged as done currently in IEEE 802.11i (step 616).

Figure 7:
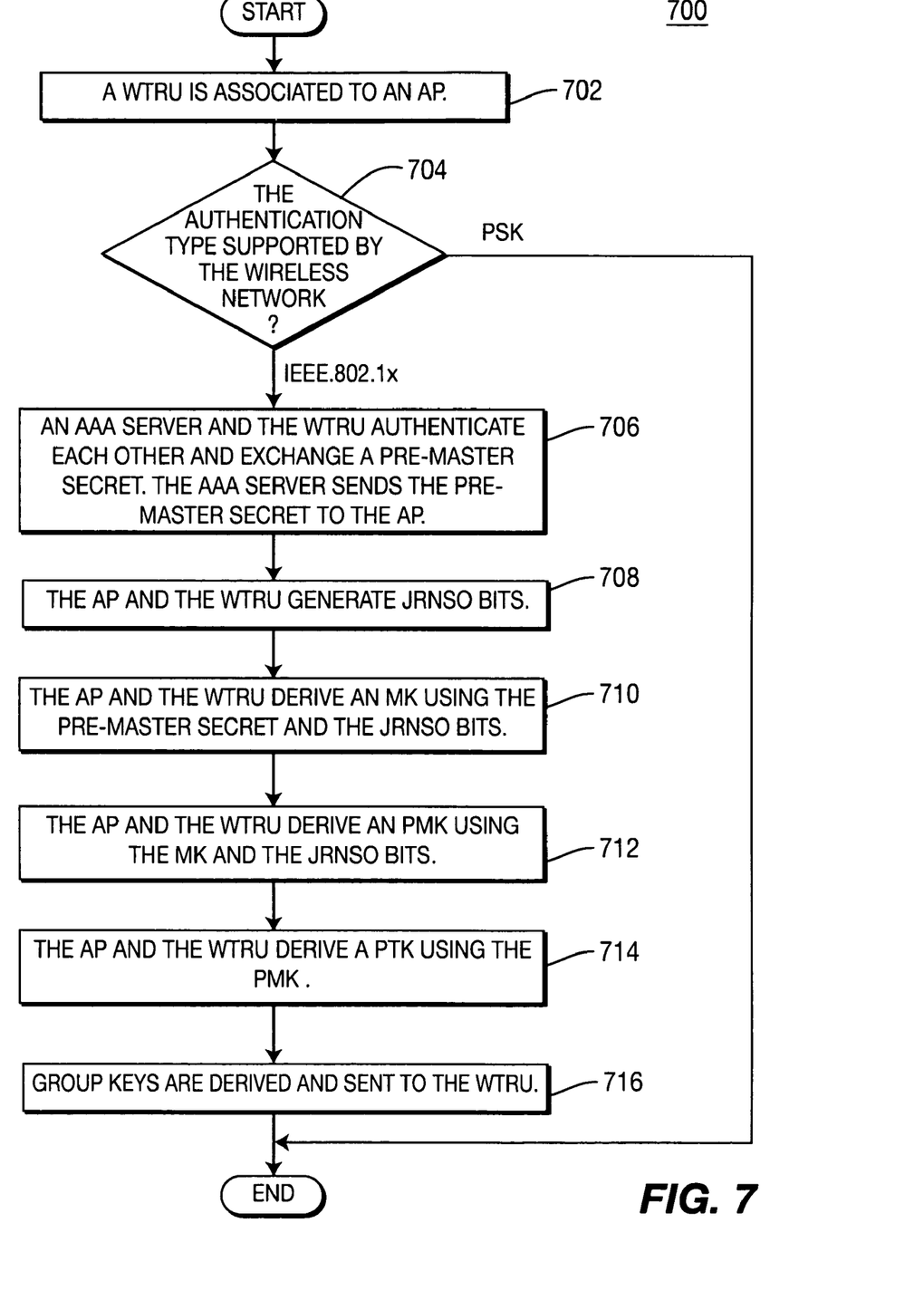
FIG. 7 is a flow diagram of a process for deriving an encryption key using JRNSO bits in accordance with still another embodiment of the present invention.

FIG. 7 is a flow diagram of a process 700 for deriving an encryption key using JRNSO bits in accordance with yet another embodiment of the present invention. Once a WTRU is associated to an AP at step 702, it is determined whether the authentication type supported by the wireless network is IEEE 802.1x or PSK (step 704). PSK is not supported but only IEEE 802.1x is supported in this embodiment. If PSK is the type supported by the network, the process ends. If IEEE 802.1x is supported, an AAA server and the WTRU exchange a pre-master secret and the AAA server sends the pre-master secret to the AP (step 706).

The WTRU and the AP derive an MK using the pre-master secret and JRNSO bits (step 710). Then the WTRU and the AP derive a PMK using the MK and the JRNSO bits (step 712). The AP and the WTRU derive a PTK using the PMK (step 714). Group keys are then derived and exchanged as done currently in IEEE 802.11i (step 716).

Figure 8:
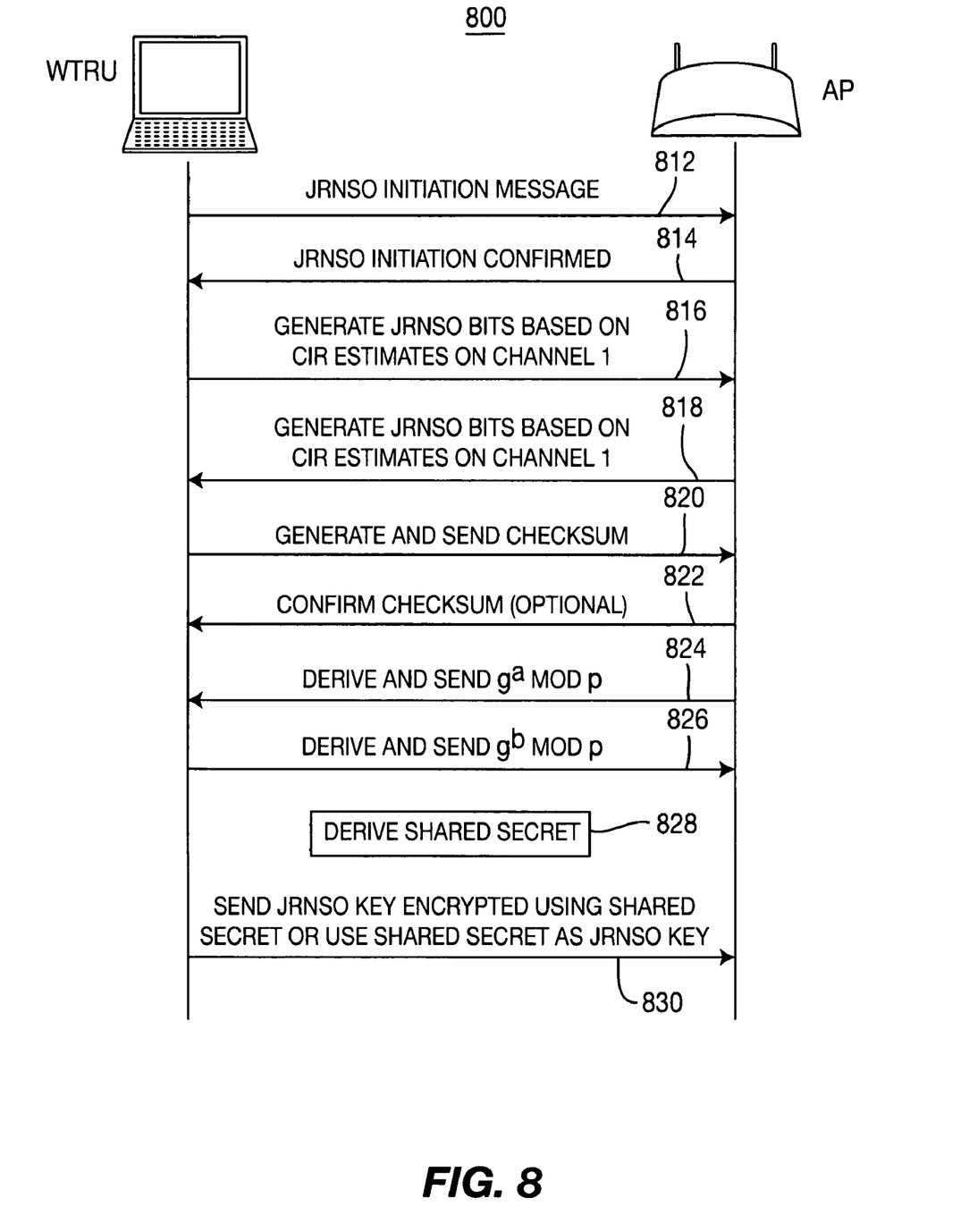
FIG. 8 is a flow diagram of a process for deriving an encryption key using a Diffie-Hellman key derivation algorithm in accordance with the present invention.

FIG. 8 is a flow diagram of a process 800 for deriving an encryption key using a Diffie-Hellman protocol in accordance with the present invention. A WTRU 802 and an AP 804 agree to use JRNSO for driving a key by exchanging a JRNSO initiation message to an AP and a JRNSO initiation confirmation (steps 812, 814). The WTRU 802 and the AP 804 generate JRNSO bits based on CIR estimates from transmissions between each other (steps 816,818). The WTRU 802, (who takes a lead), generates parity bits by performing error correction coding on the generated CIR estimate and sends the parity bits to the AP 804 (step 820). The AP 804 performs error correction decoding using the received parity bits and may optionally send a confirmation (step 822). The steps 816-822 may be repeated several times.

The WTRU 802 and the AP 804 have a pre-defined look-up table (LUT) that stores secret numbers p and g (prime numbers) for mapping the JRNSO bits to the p and g values. For example, if the JRNSO measurement generates 5 bits of secret data, the WTRU 802 and the AP 804 can choose one of 16 possible unique values for the prime number p and another 16 values for the base g. It should be noted that other schemes may be used instead of LUT, which is obvious to those skilled in the art. The stored prime numbers should be large but not necessarily as large as in a conventional Diffie-Hellman protocol because of an additional layer of security with p and g secret in accordance with the present invention. The prime numbers should preferably also differ in orders of magnitude so that it is hard for an attacker to guess the range of modulo values. While the mapping of JRNSO bits to the LUT values can be known publicly, an attacker will not have knowledge of which value was actually picked because the attacker cannot eavesdrop on the JRNSO measurements.

The WTRU 802 and the AP 804 choose secret integers a and b, respectively, and send $g^a$ mod p and $g^b$ mod p to the other party, respectively, and drive b and a, respectively (steps 824, 826). The WTRU 802 and the AP 804 use this to derive a shared secret (step 828). The WTRU and the AP send a JRNSO key encrypted using the shared secret or use the shared secret as a JRNSO key (step 830).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for deriving an encryption key for securing wireless communications the method comprising:
    a wireless transmit/receive unit (WRTU) obtaining an association to an access point (AP);
    the WTRU determining a secret that complies with a supported authentication;
    the WTRU generating a channel impulse response (CIR) estimate based upon a signal received from the AP;
    the WTRU correcting errors in the CIR estimate and generating parity bits by performing error correction coding on the CIR estimate;
    the WTRU multiplexing the parity bits with a synchronization code to generate a multiplexed bit stream;
    the WTRU transmitting the multiplexed bit stream to the AP;
    the WTRU generating joint-randomness-not-shared-with-others (JRNSO) bits from the corrected CIR estimate;
    the WTRU deriving a pairwise master key (PMK) using the secret and the JRNSO bits; and
    the WTRU deriving a pairwise transient key (PTK) using the PMK and the JRNSO bits.

2. The method of claim 1, further comprising:
    receiving a group key from the AP, wherein the group key is derived from one of the PMK and the PTK.

3. The method of claim 1, wherein the determining a secret includes:
    on a condition that the supported authentication type is not based on a pre-shared key (PSK), authenticating with an authentication server and reporting the secret to the authentication server; and
    on a condition that the supported authentication type is based on a PSK, setting the PSK as one of the secret, the master key, and the PMK.

4. The method of claim 3, further comprising receiving a group key from the AP, wherein the group key is derived from one of the PMK and the PTK.

5. The method of claim 1, further comprising generating other JRNSO bits for updating an encryption key, whereby a new encryption key is generated by using the new JRNSO bits and the encryption key is one of the secret, the master key, the PMK, and the PTK.

6. The method of claim 1, further comprising reporting a portion of an encryption key to the AP to confirm the encryption key, wherein the encryption key is one of the secret, the master key, the PMK, and the PTK.

7. The method of claim 1 wherein the determining the secret includes determining a second pairwise master key (PMK) by:
    on a condition that the supported authentication type is not a pre-shared key (PSK) type:
        authenticating with an authentication server,
        reporting a master secret to the authentication server, and
        deriving the second PMK from the master secret;
    on a condition that the supported authentication type is PSK, using a pre-shared key (PSK) as the second PMK; and
        using the second PMK as the secret.

8. The method of claim 7, further comprising
    receiving a group key from the AP, wherein the group key is derived from one of the second PMK and the PTK.

9. A wireless transmit/receive unit (WTRU) for deriving an encryption key for securing wireless communications, the system WTRU comprising:
    a memory electronically coupled to a processor;
    a transceiver electronically coupled to the processor;
    the processor configured to:
        report a secret to an authentication server;
        generate a channel impulse response (CIR) estimate of a communication received from an access point (AP);
        correct errors in the CIR estimate and generate parity bits by performing error correction coding on the CIR estimate;

multiplex the parity bits with a synchronization code to generate a multiplexed bit stream;

instruct the transceiver to transmit the multiplexed bit stream to the AP;

generate joint-randomness-not-shared-with-others (JRNSO) bits from the corrected CIR estimate;

derive a pairwise master key (PMK) using the secret and the JRNSO bits; and derive a pairwise transient key (PTK) using the PMK and the JRNSO bits.

10. The WTRU of claim 9, wherein the WTRU is configured receive a group key from the AP, wherein the group key is derived from one of the PMK and the PTK.

11. The WTRU of claim 9, wherein the WTRU is configured to authenticate using IEEE 802.1x authentication.

12. The WTRU of claim 9, wherein the WTRU is configured to authenticate using pre-shared key (PSK) authentication, and to use a PSK as the secret.

13. The WTRU of claim 9, wherein the WTRU is configured to report a portion of the encryption key to the AP to confirm the encryption key.

14. A wireless transmit/receive unit (WTRU) for deriving an encryption key for securing wireless communications, the WTRU comprising:

a memory operatively connected to a processor;

a transceiver electronically coupled to the processor;

the processor configured to:

report a master secret to an authentication server;

generate a channel impulse response (CIR) estimate of a communication received from an access point (AP);

correct errors in the CIR estimate and generate parity bits by performing error correction coding on the CIR estimate;

multiplex the parity bits with a synchronization code to generate multiplexed bit stream;

instruct the transceiver to transmit the multiplexed bit stream to the AP;

generate joint-randomness-not-shared-with-others (JRNSO) bits from the corrected CIR estimate;

derive a pairwise master key (PMK) using the master secret and the JRNSO bits; and derive a pairwise transient key (PTK) using the PMK and the JRNSO bits.

15. The WTRU of claim 14, wherein the WTRU is configured to receive a group key from the AP, wherein the group key is derived from one of the PMK and the PTK.

16. The WTRU of claim 14, wherein the WTRU is configured to authenticate using IEEE 802.1x authentication.

17. The WTRU of claim 14, wherein the WTRU is configured to authenticate using pre-shared key (PSK) authentication, whereby the PSK is set to one of the secret, the master key, and the PMK.

18. A wireless transmit/receive unit (WTRU) for deriving an encryption key for securing wireless communications, the WTRU comprising:

a memory operatively connected to a processor;

a transceiver operatively coupled to the processor;

the processor configured to:

report a pre-master secret to an authentication server;

generate a channel impulse response (CIR) estimate of a communication received from an access point (AP);

correct errors in the CIR estimate and generate parity bits by performing error correction coding on the CIR estimate;

multiplex the parity bits with a synchronization code to generate a multiplexed bit stream;

instruct the transceiver to transmit the multiplexed bit stream to the AP;

generate joint-randomness-not-shared-with others (JRNSO) bits from the corrected estimate;

derive a master key from the pre-master secret and the JRNSO bits;

derive a pairwise master key (PMK) using the master key and the JRNSO bits; and derive a pairwise transient key (PTK) using the PMK and the JRNSO bits.

19. The WTRU of claim 18, wherein the WTRU is configured to receive a group key from the AP, wherein the group key is derived from one of the PMK and the PTK.

* * * * *